(12) United States Patent
Lee

(10) Patent No.: US 11,489,318 B2
(45) Date of Patent: Nov. 1, 2022

(54) DISTRIBUTION BOX

(71) Applicant: MOBILETRON ELECTRONICS CO., LTD., Taichung (TW)

(72) Inventor: Hsiang-Lin Lee, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 8 days.

(21) Appl. No.: 17/153,024

(22) Filed: Jan. 20, 2021

(65) Prior Publication Data

US 2021/0226424 A1  Jul. 22, 2021

(30) Foreign Application Priority Data

Jan. 20, 2020 (TW) .................................. 109102001

(51) Int. Cl.
*H02B 1/00* (2006.01)
*H02B 1/46* (2006.01)
*H02B 1/28* (2006.01)

(52) U.S. Cl.
CPC ............... *H02B 1/46* (2013.01); *H02B 1/28* (2013.01)

(58) Field of Classification Search
CPC ...................................... H02B 1/46; H02B 1/28
See application file for complete search history.

(56) References Cited

U.S. PATENT DOCUMENTS

| 8,010,170 | B2 * | 8/2011 | Shi | H01M 50/209 |
| | | | | 455/575.8 |
| 10,468,817 | B1 * | 11/2019 | Lee | H01R 13/502 |
| 2009/0322191 | A1 * | 12/2009 | Chang | H04M 1/0249 |
| | | | | 292/137 |
| 2010/0101285 | A1 * | 4/2010 | Hsu | G06F 1/183 |
| | | | | 70/58 |

FOREIGN PATENT DOCUMENTS

| CN | 106129857 A | 11/2016 |
| CN | 206758871 U | 12/2017 |
| CN | 209561940 U | 10/2019 |
| TW | M349662 U | 1/2009 |

OTHER PUBLICATIONS

Search report for TW109102001, dated May 11, 2020, Total of 1 page.
English abstract for CN106129857, Total of 1 page.
English abstract for CN206758871, Total of 1 page.
English abstract for CN209561940, Total of 1 page.
English abstract for TWM349662, Total of 1 page.

* cited by examiner

*Primary Examiner* — Pete T Lee

(74) *Attorney, Agent, or Firm* — Apex Juris, PLLC; R Lynette Wylie

(57) ABSTRACT

A distribution box includes a box body, a cover plate, and at least one guiding rail. The box body has several side plates and a base plate. An opening is formed by surrounding an end of each side plate. The base plate is connected to another end of each side plate. The cover plate is detachably engaged with the box body and closes the opening. The guiding rail is disposed inside the box body and has an open end facing toward the opening. At least one electrical accessory slides into the guiding rail from the open end and is engaged with the guiding rail. With the open end facing toward the opening, the electrical accessory could be easily disassembled and assembled without reserving an installation space at a position adjacent to the open end for providing other electrical accessories, which provides an effect of saving installation space.

5 Claims, 6 Drawing Sheets

DISTRIBUTION BOX

BACKGROUND OF THE INVENTION

Technical Field

The present invention relates generally to a distribution box, and more particularly to a distribution box that could facilitate disassembly and assembly of electrical accessories and save an installation space.

Description of Related Art

Conventional distribution boxes are used to install various electrical accessories, such as switches, fuses, etc. Generally, the distribution box is surrounded by four side panels and a bottom plate to form a receiving space with an opening. For mounting the electrical accessories in the distribution box, a plurality of horizontal slide rails is usually disposed on the bottom plate, and each of the electrical accessories has a groove corresponding to the horizontal slide rails, wherein the groove of each of the electrical accessories fits around an open end of one of the horizontal slide rails, and each of the electrical accessories slides into the corresponding horizontal slide rail and moves to a predetermined position to be fixed by a bolt, thereby completing an installation of the electrical accessories.

However, since the slide rails are set on the bottom plate of the distribution box, an installation space must be reserved between the open end of each of the slide rail and the side plates of the distribution box for providing the electrical accessories. The installation space not only wastes the receiving space of the distribution box, but also restricts the layout of the receiving space of the distribution box, which causes inconvenience for users. Besides, the conventional electrical accessories are fixed by bolts, which takes a lot of time to disassemble and replace these electrical accessories. In all aspects, the conventional distribution box still has room for improvement.

BRIEF SUMMARY OF THE INVENTION

In view of the above, the primary objective of the present invention is to provide a distribution box, which could facilitate disassembly and assembly of electrical accessories and save an installation space.

The present invention provides a distribution box including a box body, a cover plate, and at least one guiding rail, wherein the box body has an opening, a plurality of side plates, and a base plate. The opening is surrounded by an end of each of the side plates, and the base plate is connected to another end of each of the side plates. The cover plate is detachably engaged with the box body and closes the opening. The at least one guiding rail is disposed inside the box body and has an open end, wherein the open end faces toward the opening, and the at least one electrical accessory is engaged with the at least one guiding rail via the open end.

With the aforementioned design, by disposing the open end of the guiding rail facing toward the opening, the electrical accessories could be easily disassembled and assembled, and there is no need to reserve an installation space at a position adjacent to the open end of the guiding rail for providing the electrical accessories, which provides an effect of saving installation space.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
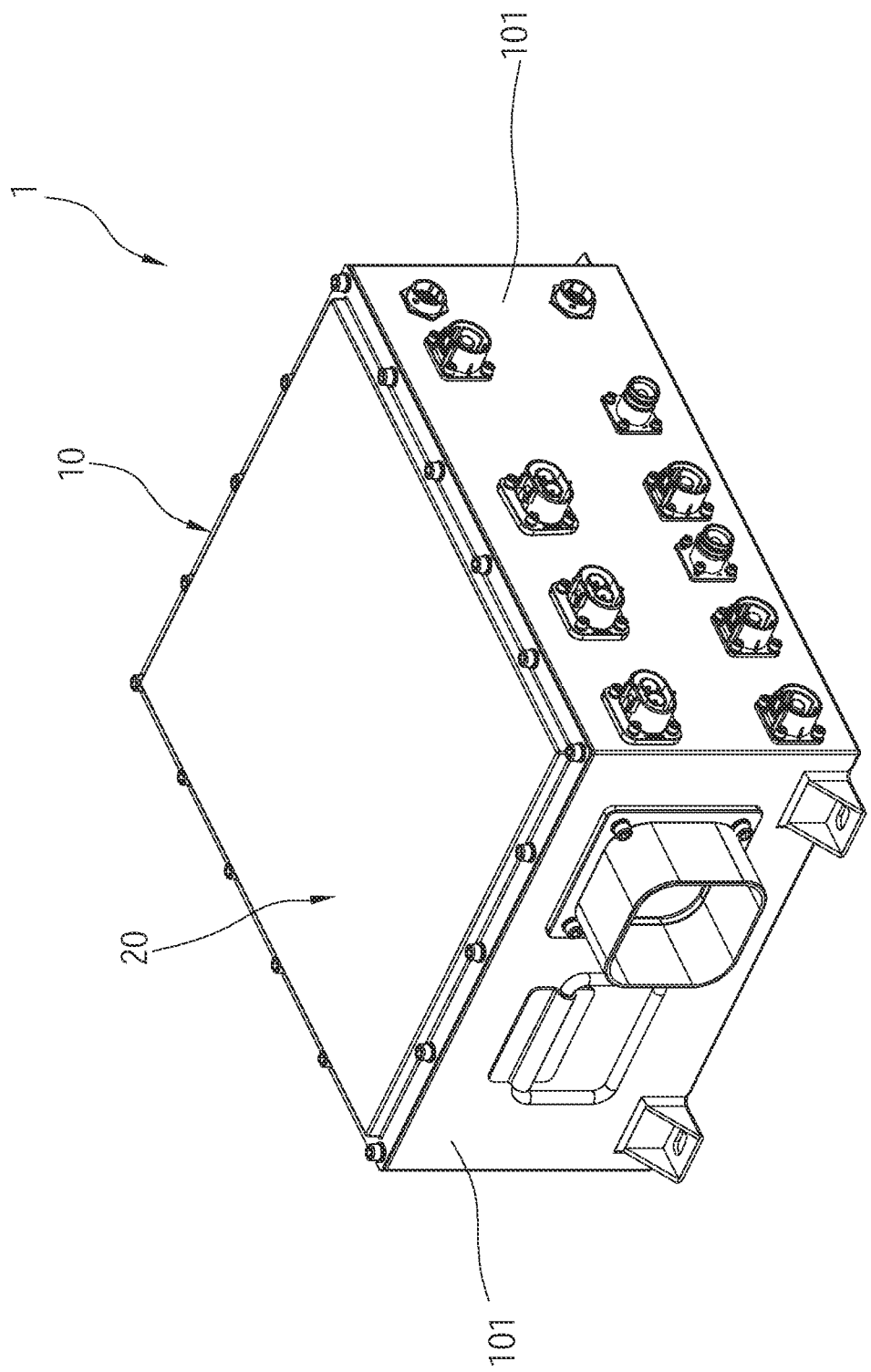
FIG. 1 is a perspective view of the distribution box according to an embodiment of the present invention.
Figure 2:
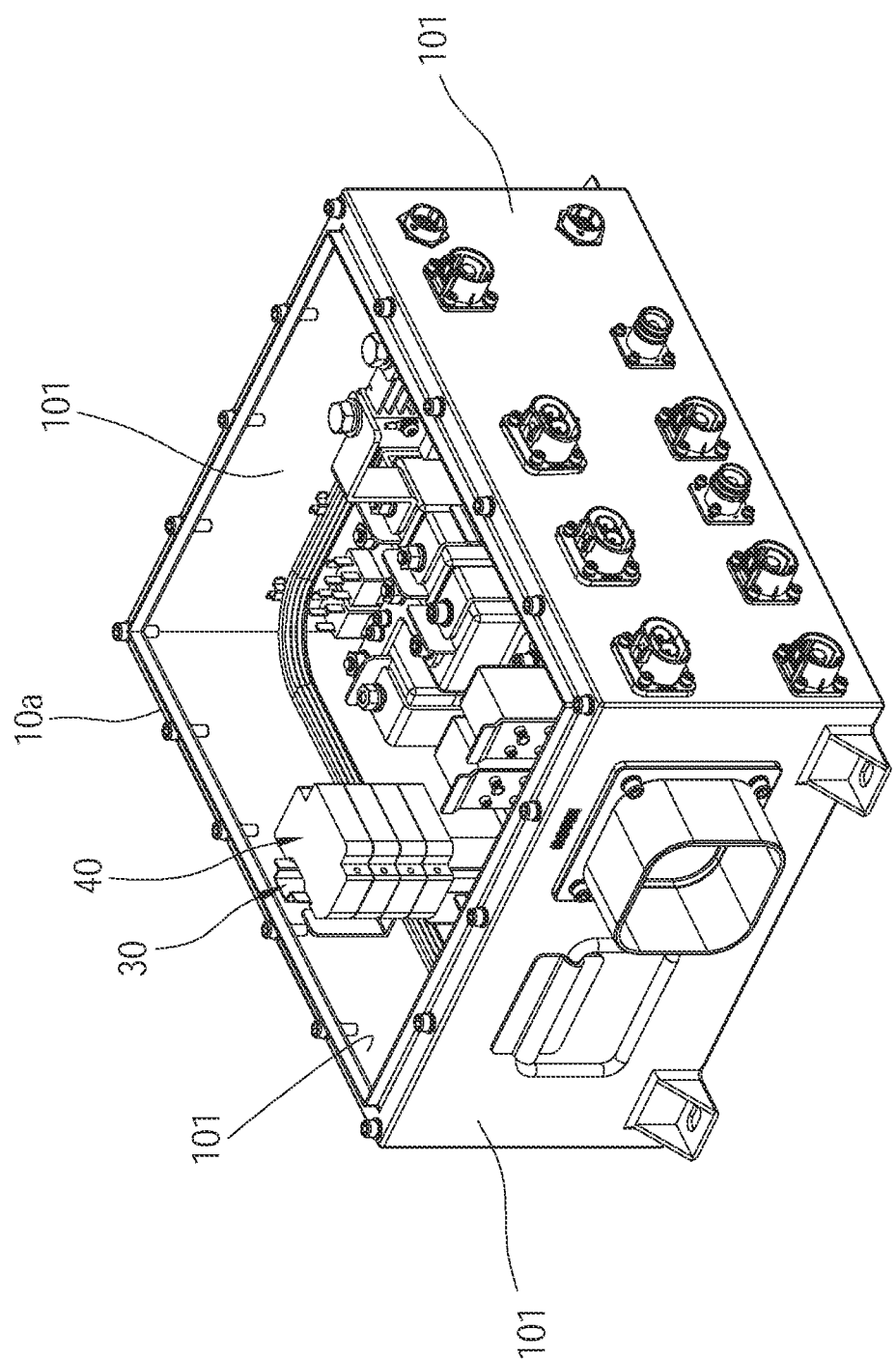
FIG. 2 is a perspective view of the distribution box according to the embodiment of the present invention, wherein the cover plate is omitted.
Figure 3:
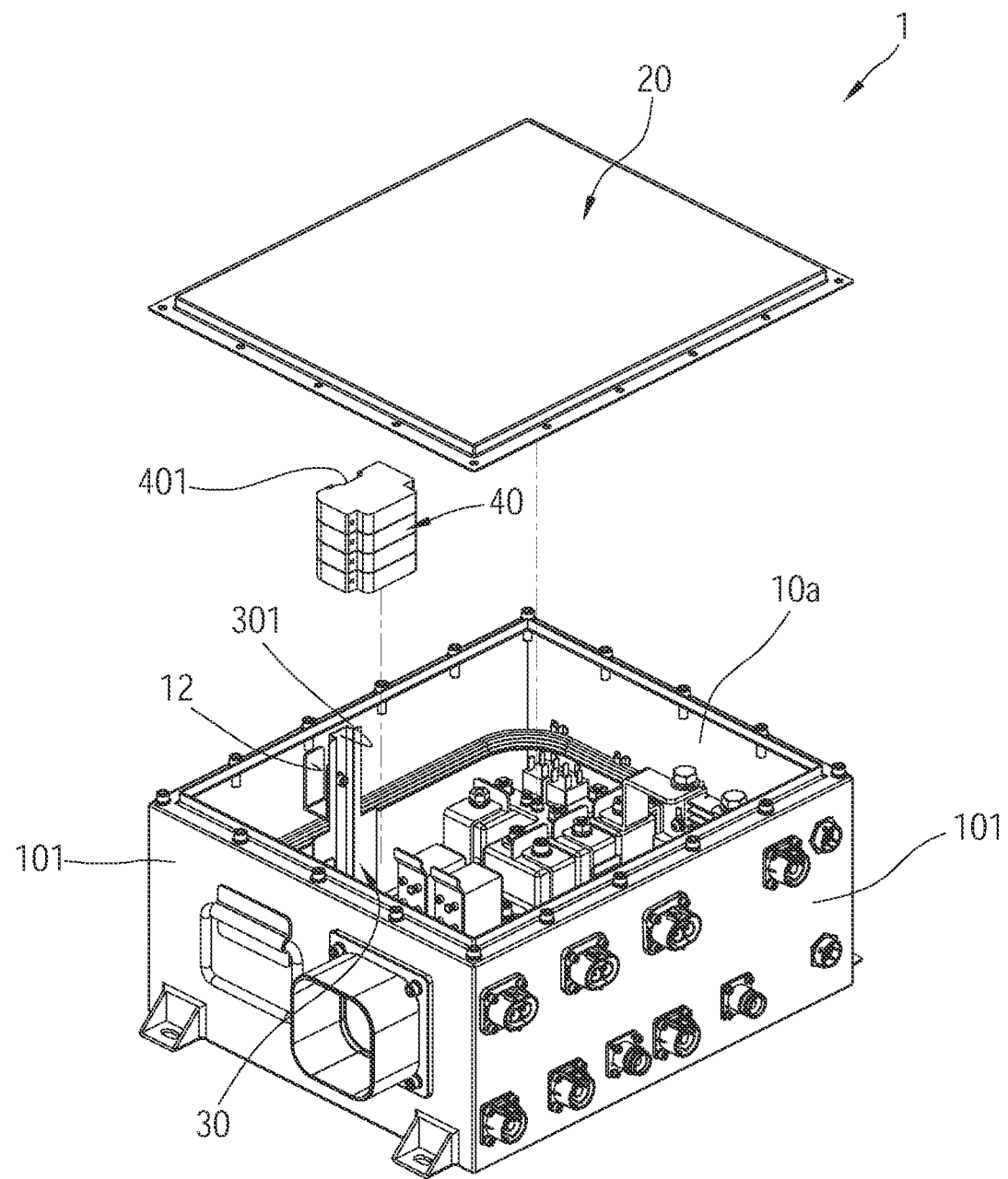
FIG. 3 is a partially exploded view of the distribution box according to the embodiment of the present invention.
Figure 4:
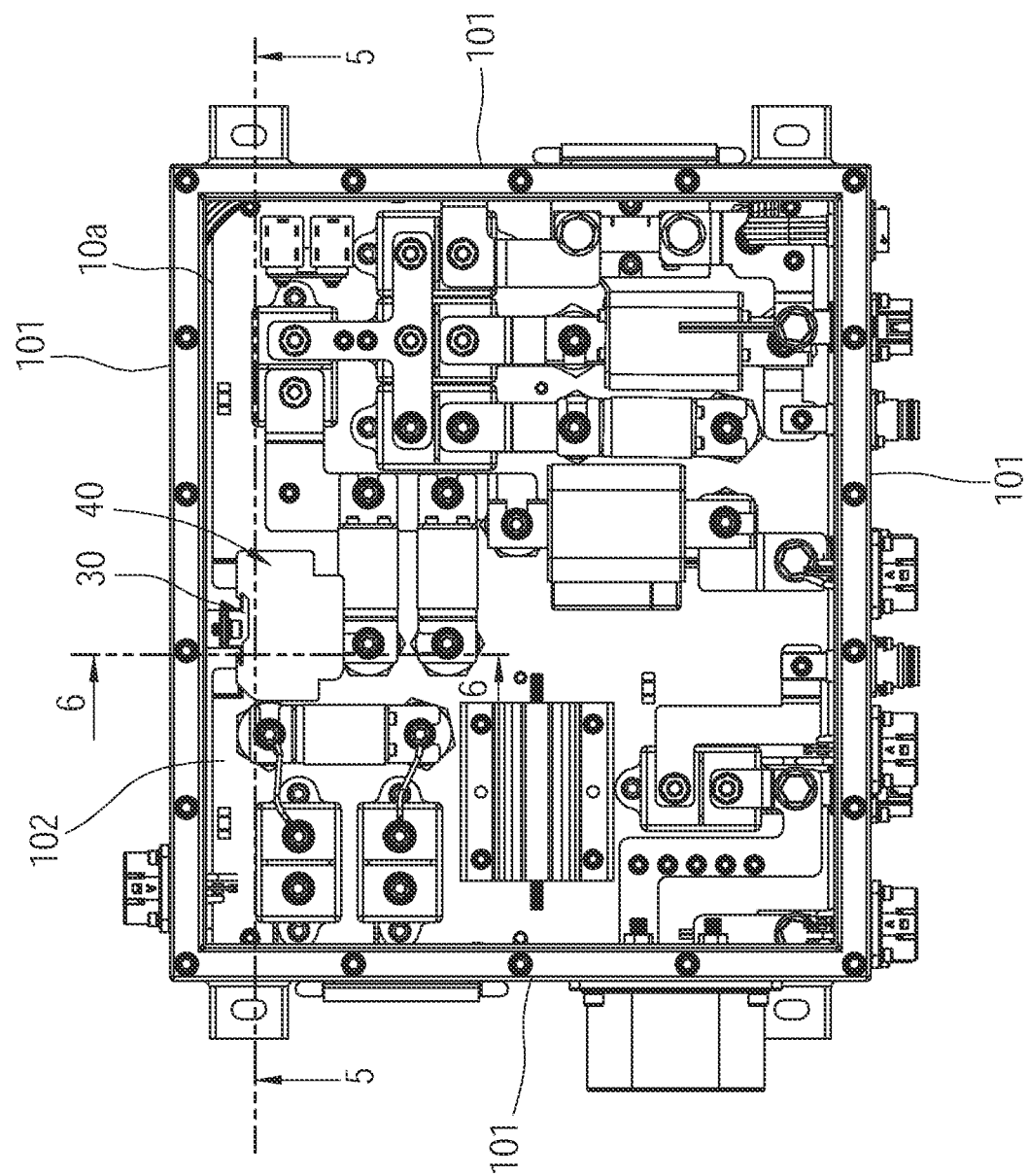
FIG. 4 is a top view of the distribution box according to the embodiment of the present invention, wherein the cover plate is omitted.
Figure 5:
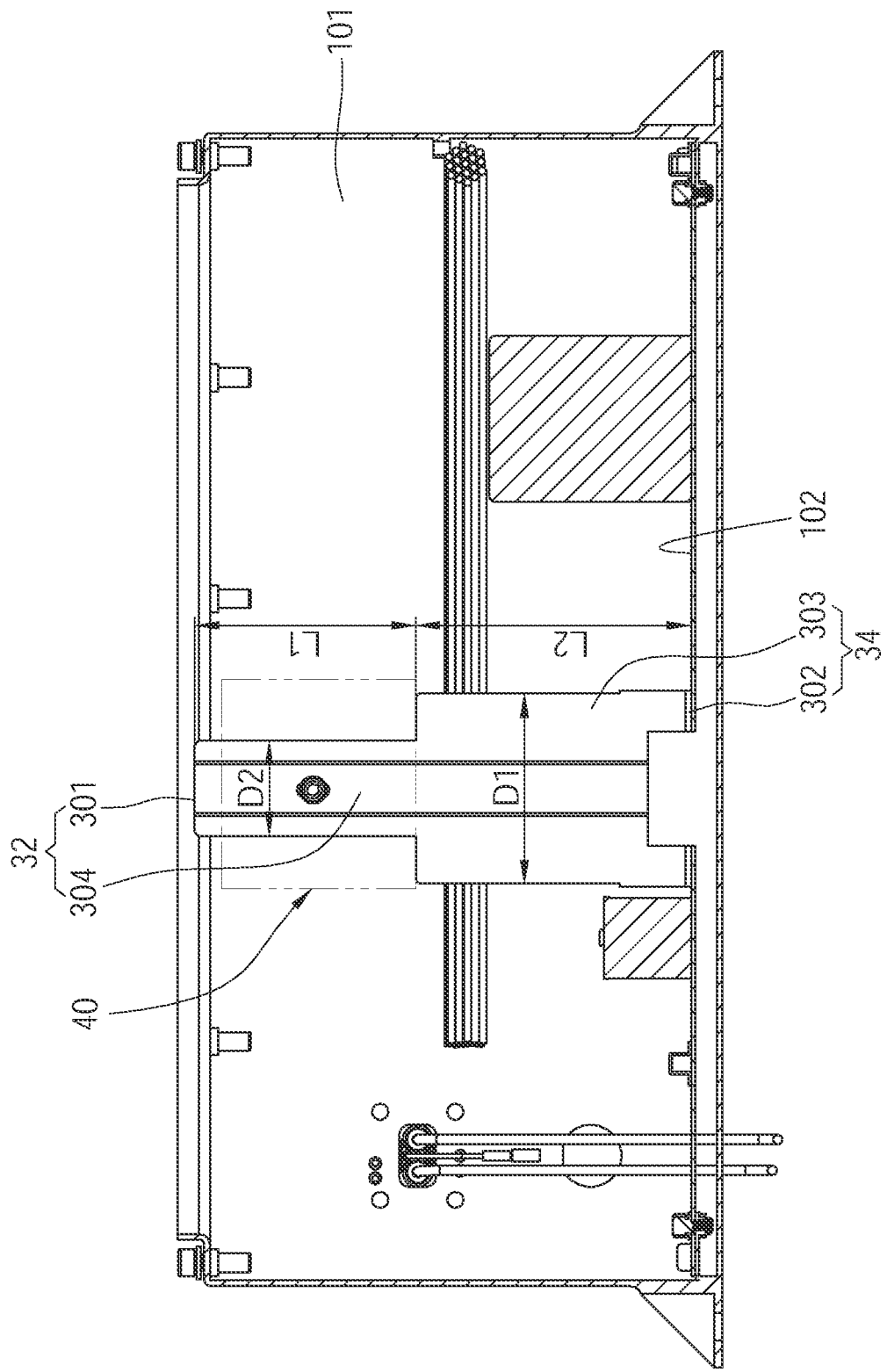
FIG. 5 is a sectional view along the 5-5 line in FIG. 4.

A distribution box 1 according to an embodiment of the present invention is illustrated in FIG. 1 to FIG. 6, wherein at least one electrical accessory such as a circuit breaker, a transformer, a relay, a fuse, etc. could be disposed inside the distribution box 1. In the current embodiment, the distribution box 1 is a distribution box 1 applied to an electric car as an example. However, this is not a limitation of the present invention.

The distribution box 1 includes a box body 10, a cover plate 20, and a guiding rail 30, wherein the box body 10 has a plurality of side plates 101, a base plate 102, and an opening 10a which is surrounded by an end of each of the side plates 101, and the base plate 102 is connected to another end of each of the side plates 101. The cover plate 20 is detachably engaged with the box body 10 and is adapted to close the opening 10a. In this way, the side plates 101 and the base plate 102 surround to form a receiving space having the opening 10a, and the opening 10a could be opened and closed by disassembling and assembling the cover plate 20.

In the current embodiment, the guiding rail 30 and an electrical accessory 40 are disposed in the receiving space in the box body 10, wherein the electrical accessory 40 is a circuit breaker as an example. The electrical accessory 40 has a groove 401 matching with the guiding rail 30, wherein the guiding rail 30 has an open end 301 facing toward the opening 10a, and the groove 401 of the electrical accessory 40 could be engaged with the guiding rail 30 via the open end 301. With the open end 301 facing toward the opening 10a, the electrical accessory 40 could be easily assembled and disassembled without reserving an installation space at the open end 301 of the guiding rail 30 for mounting the electrical accessory 40, which provides an effect of saving installation space. In addition, when the cover plate 20 is engaged with the box body 10 and closes the opening 10a, the cover plate 20 closes the open end 301 of the guiding rail 30, thereby preventing the electrical accessory from disengaging from the open end without using bolts to fix. In practice, two or more than two electrical accessories 40 and two or more than two guiding rails 30 could be provided to meet various requirements.

The guiding rail 30 has a connecting end 302, a restricting portion 303, a sliding portion 304, and the open end 301 connected in sequence from bottom up, wherein the connecting end 302 is opposite to the open end 301 and is connected to the base plate 102. The restricting portion 303 is located between the open end 301 and the connecting end 302. The electrical accessory 40 could slide into the guiding rail 30 from the open end 301 along a longitudinal direction of the guiding rail 30 and slide on the sliding portion 304, wherein in a latitudinal direction of the guiding rail 30, a length D1 of the restricting portion 303 is greater than a length D2 of the sliding portion 304, thereby restricting a movement of the electrical accessory 40 on the guiding rail 30. In other words, the groove 401 of the electrical accessory 40 could move on the sliding portion 304 along the longitudinal direction of the guiding rail 30 and is restricted by the length of the restricting portion 303 in the latitudinal direction of the guiding rail 30, so that when the electrical accessory 40 moves to a junction between the sliding portion 304 and the restricting portion 303, the electrical accessory 40 abuts against the restricting portion 303, thereby to be located at a vertical height relative to the base plate 102. In this way, other electrical accessories 40 could be mounted on the base plate 102 which is adjacent to the guiding rail 30, making full use of the receiving space inside the box body 10 and improving the problem of insufficient receiving space due to the electrical accessory 40 is mounted on the base plate 102 of the conventional distribution box.

In the current embodiment, the guiding rail 30 includes a first section 32 and a second section 34, wherein the first section 32 has the open end 301 and the sliding portion 304, and the second section 34 has the restricting portion 303 and the connecting end 302. A length L1 of the second section 34 in the longitudinal direction of the guiding rail 30 is greater than a length L2 of the first section 32 in the longitudinal direction of the guiding rail 30.

Figure 6:
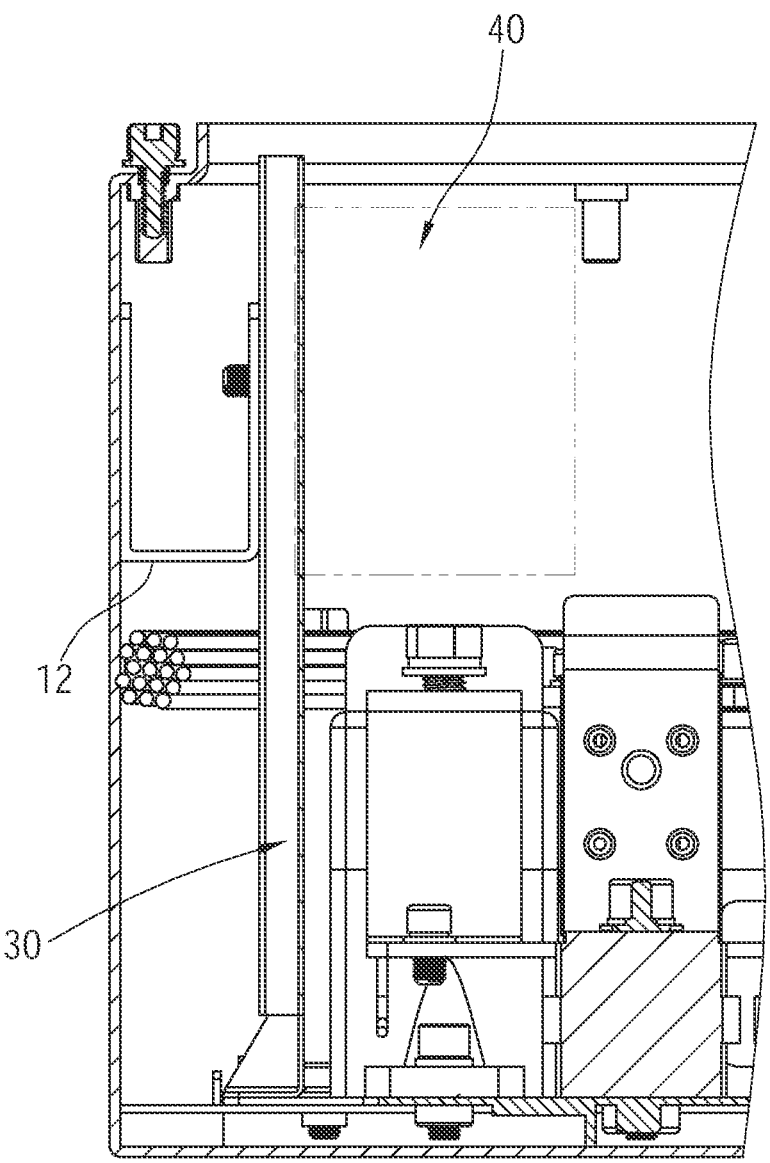
FIG. 6 is a sectional view along the 6-6 line in FIG. 4.

Referring to FIG. 6, the box body 10 has a connecting member 12 which is U-shaped, wherein an end of the connecting member 12 is connected to one of the side plates 101, while another end of the connecting member 12 is connected to the guiding rail 30, thereby firmly fixing the guiding rail 30 in the box body 10.

With the aforementioned design, the distribution box 1 of the present invention could facilitate disassembly and assembly of electrical accessory 40 without reserving an installation space at the open end 301 of the guiding rail 30 for mounting the electrical accessory 40, which provides an effect of saving installation space. In addition, by disposing the restricting portion 303, the electrical accessory 40 could abut against the restricting portion 303, thereby to be mounted at the vertical height relative to the base plate 102, which provides more space between the restricting portion 303 and the base plate 102 for mounting other electrical accessories.

It must be pointed out that the embodiments described above are only some preferred embodiments of the present invention. All equivalent structures which employ the concepts disclosed in this specification and the appended claims should fall within the scope of the present invention.

DESCRIPTION OF MAIN COMPONENT SYMBOLS 1 distribution box
10 box body
10a opening
101 side plates
102 base plate
12 connecting member
20 cover plate
30 guiding rail
301 open end
302 connecting end
303 restricting portion
304 sliding portion
32 first section
34 second section
40 electrical accessory
401 groove
D1, D2, L1, L2 length

What is claimed is:

1. A distribution box, wherein at least one electrical accessory is disposed inside the distribution box; the distribution box comprising:
   a box body having an opening, a plurality of side plates, a connecting member, and a base plate, wherein the opening is surrounded by an end of each of the side plates, and the base plate is connected to another end of each of the side plates;
   a cover plate detachably engaged with the box body and closing the opening; and
   at least one guiding rail disposed inside the box body and having an open end, wherein the open end faces toward the opening, and the at least one electrical accessory is engaged with the at least one guiding rail via the open end; the at least one guiding rail has a connecting end which is opposite to the open end and is connected to the base plate; the at least one guiding rail has a restricting portion which is located between the open end and the connecting end and is adapted to restrict a movement of the at least one electrical accessory on the at least one guiding rail;
   wherein the connecting member is U-shaped; an end of the connecting member is connected to one of the side plates, and while another end of the connecting member is connected to the at least one guiding rail, thereby the at least one guiding rail is connected to one of the side plates via the connecting member.

2. The distribution box as claimed in claim 1, wherein the at least one electrical accessory slides into the at least one guiding rail from the open end along a longitudinal direction of the at least one guiding rail.

3. The distribution box as claimed in claim 1, wherein the at least one guiding rail has a sliding portion; the at least one electrical accessory moves on the sliding portion along a longitudinal direction of the at least one guiding rail; in a latitudinal direction of the at least one guiding rail, a length of the restricting portion is greater than a length of the sliding portion.

4. The distribution box as claimed in claim 3, wherein the at least one guiding rail comprises a first section and a second section; the first section has the open end and the sliding portion, and the second section has the restricting portion and the connecting end; a length of the second section in the longitudinal direction of the at least one guiding rail is greater than a length of the first section in the longitudinal direction of the at least one guiding rail.

5. The distribution box as claimed in claim 1, wherein when the cover plate is engaged with the box body and closes the opening, the cover plate closes the open end of the at least one guiding rail.

* * * * *